A. R. PRITCHARD.
BAIL RETAINER.
APPLICATION FILED FEB. 23, 1911.

992,983.

Patented May 23, 1911.

Witnesses:
Clarence W. Carroll
L. Thor

Inventor:
Albert R. Pritchard
by his attorneys
Osgood, Davis & Dorsey

UNITED STATES PATENT OFFICE.

ALBERT R. PRITCHARD, OF ROCHESTER, NEW YORK.

BAIL-RETAINER.

992,983.   Specification of Letters Patent.   Patented May 23, 1911.

Application filed February 23, 1911. Serial No. 610,441.

*To all whom it may concern:*

Be it known that I, ALBERT R. PRITCHARD, a citizen of the United States, and resident of Rochester, in the county of Monroe and State of New York, have invented certain new and useful Improvements in Bail-Retainers, of which the following is a specification.

This invention relates to tubular lanterns of the ordinary type, having wire bails or handles pivoted at their ends to the air-tubes of the lanterns.

One object of the invention is to produce a simple and inexpensive device for resiliently retaining the bail in upright position, ready for convenient use. To this end I employ a retaining device of novel form, consisting in a loop of resilient wire, this loop being secured at its ends to the air-tube adjacent the pivotal bearing of the bail, and having a middle portion adapted to straddle the bail, when the latter is in upright position.

A second object of the invention is to provide means for securing the bail more effectively in its pivotal bearings on the air-tubes, and to this end, in the preferred embodiment of the invention, I so arrange the wire loop before mentioned that it bears against the outer surface of the bail, so as to force the bent ends of the bail inwardly, and retain them securely in their bearings.

Figure 1:
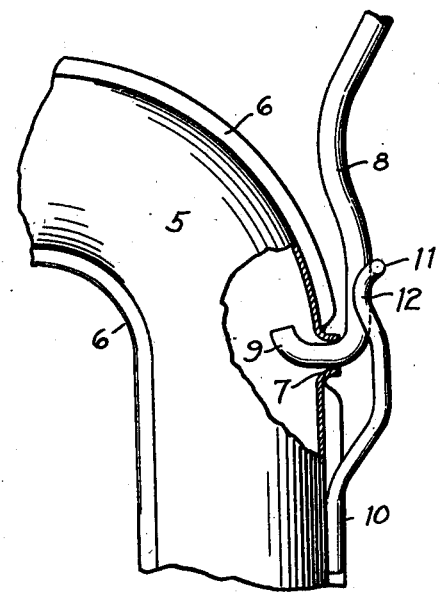
Figure 2:
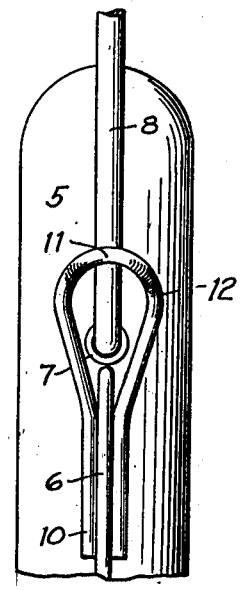
Figure 3:
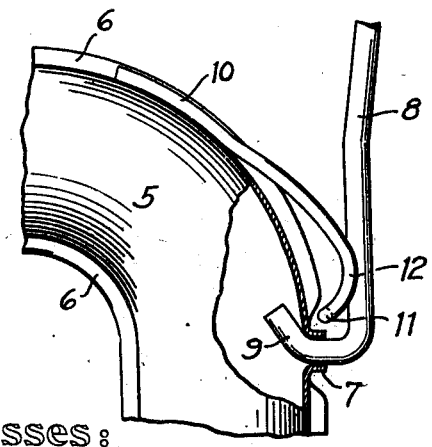
Figure 4:
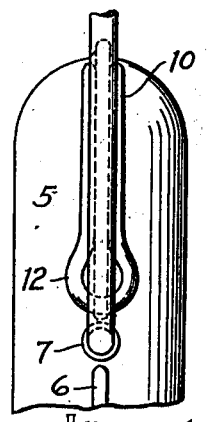

In the accompanying drawings:—Figure 1 is a front-elevation, partly in section, on an enlarged scale, of a portion of a lantern embodying the present invention; Fig. 2 is a side-elevation of the same; and Figs. 3 and 4 are a front-elevation and a side-elevation, respectively, of a modified form of the invention.

As the invention is applicable to tubular lanterns of any ordinary form, only so much of the lantern is shown in the drawings as is necessary for an understanding of the invention.

The lantern illustrated is provided with the usual air-tubes, comprising pressed sheet-metal members 5, joined by the usual seams 6. Each air-tube is provided with the usual outwardly-extending nipple 7, in which one end of the bail 8 is pivoted. This bail is constructed of wire in the usual form, and has an inwardly-bent end 9 pivoted in the nipple 7 of each air-tube.

In the most complete embodiment of the invention, shown in Figs. 1 and 2, the bail-retainer in which the invention particularly resides is in the form of a wire loop, having two parallel ends 10 which are fixed, by soldering or otherwise, to the outer surface of the air-tube on either side of the seam 6. The loop extends upwardly from its point of attachment to the air-tube, and its middle portion is bent so as to form an outwardly-extending depression 11 in which the bail rests when in upright position, and two rounded inwardly-projecting portions 12, which straddle the bail when in this position, as shown in Fig. 1. In this manner the bail is resiliently retained in upright position, but it may be readily swung downward when desired, as in such movement it will readily ride over the rounded projections 12, causing the loop to spring outwardly to permit this movement.

The loop, owing to its resilient character, bears constantly against the bail with an inward pressure, and it thus tends to maintain the bent ends 9 of the bail securely within the bearing-nipple 7. This is a valuable feature of the invention, since it has been found in practice that the ends of the bail are liable to become accidentally detached from the bearings, particularly after the latter have been somewhat enlarged by the strain of the wear of the bail.

While the embodiment of the invention illustrated in Figs. 1 and 2 combines both novel and valuable features above referred to, it may sometimes be preferred to employ the embodiment illustrated in Figs. 3 and 4. In this embodiment the bail-retainer does not act to press the bail inwardly in its bearings, but it has the advantage, over the form of the invention just described, that the retainer is located entirely within the sides of the bail, so as to be protected from injury, and to produce a neat and compact appearance. In this construction the ends of the wire retainer-loop are secured to the air-tube above the bail-bearing, instead of below, and the middle portion of the loop straddles the inner surface of the bail. The depressed portion 11 of the loop does not engage the bail at all, but the rounded projecting portions 12 straddle the bail, when the latter is in upright position, and thus tend to retain it resiliently in such position.

I claim:—

1. In a tubular lantern, the combination, with an air-tube, of a bail pivoted upon the air-tube, and a bail-retainer comprising a looped-shaped resilient wire member rigidly secured at its ends to the air-tube and formed, at its middle portion, with two rounded projections which straddle the bail when the bail is in upright position, while permitting the bail to pass when it is moved forcibly downward.

2. In a tubular lantern, the combination, with an air-tube having a bail-receiving opening, of a bail having an inwardly-bent end engaging the opening, and a resilient member engaging the bail and pressing it toward the air-tube, said member having a recess adapted to maintain the bail yieldingly in upright position.

3. In a tubular lantern, the combination, with an air-tube having a bail-receiving opening, of a bail having an inwardly-bent end engaging the opening, and a bail-retainer comprising a loop-shaped resilient wire member secured, at its ends, to the air-tube below said opening and with its middle portion pressing inwardly against the bail and formed to straddle the bail when the bail is in upright position.

ALBERT R. PRITCHARD.

Witnesses:
D. GURNEE,
L. THON.

---

Copies of this patent may be obtained for five cents each, by addressing the "Commissioner of Patents, Washington, D. C."